United States Patent
Mori et al.

(10) Patent No.: US 8,776,961 B2
(45) Date of Patent: Jul. 15, 2014

(54) SHOCK ABSORBER AND SUSPENSION APPARATUS

(75) Inventors: Shunsuke Mori, Yokohama (JP); Kenichi Nakamura, Kawasaki (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 18 days.

(21) Appl. No.: 13/479,873

(22) Filed: May 24, 2012

(65) Prior Publication Data
US 2012/0305347 A1    Dec. 6, 2012

(30) Foreign Application Priority Data
May 31, 2011  (JP) ................................. 2011/121949

(51) Int. Cl.
*F16F 9/34* (2006.01)

(52) U.S. Cl.
USPC ..................... 188/266.2; 188/282.1; 188/315; 280/124.161

(58) Field of Classification Search
USPC ........ 188/266.1, 266.2, 282.1, 281, 313–315, 188/282.8, 322.2, 266.6; 280/5.5–5.519, 280/124.161, 5.507, 5.514, 6.157, 5.515, 280/124.158, 5.512
See application file for complete search history.

(56) References Cited

U.S. PATENT DOCUMENTS

| 5,263,559 | A  | * | 11/1993 | Mettner ..................... 188/266.5 |
| 5,586,627 | A  | * | 12/1996 | Nezu et al. ................. 188/266.6 |
| 6,394,238 | B1 | * | 5/2002  | Rogala ....................... 188/266.2 |
| 6,422,127 | B1 | * | 7/2002  | Huber et al. .................... 91/452 |
| 6,474,629 | B2 | * | 11/2002 | Beck et al. ................. 267/64.16 |
| 6,575,484 | B2 | * | 6/2003  | Rogala et al. .......... 280/124.158 |
| 6,913,126 | B2 | * | 7/2005  | Dohrmann et al. .......... 188/315 |
| 7,788,918 | B2 | * | 9/2010  | Huber et al. .................... 60/475 |
| 8,534,687 | B2 | * | 9/2013  | Coombs et al. .......... 280/124.16 |
| 2009/0242339 | A1 | * | 10/2009 | Nakadate et al. .......... 188/266.5 |
| 2011/0187065 | A1 | * | 8/2011  | Van Der Knaap et al. . 280/5.507 |
| 2012/0001399 | A1 | * | 1/2012  | Coombs et al. ........ 280/124.161 |

FOREIGN PATENT DOCUMENTS

JP    2009-281584    12/2009

\* cited by examiner

*Primary Examiner* — Thomas Irvin
(74) *Attorney, Agent, or Firm* — Wenderoth, Lind & Ponack, LLP (57) ABSTRACT

A shock absorber includes: at least one cylinder apparatus including a cylinder sealingly containing operating fluid, a piston slidably fittedly inserted in the cylinder to divide an interior of the cylinder into two chambers, and a piston rod coupled to the piston and extending to an outside of the cylinder; and at least one damping force generation mechanism connected to the cylinder apparatus, and capable of generating a damping force to be applied to a flow of the operating fluid caused by a movement of the piston and adjusting the damping force from the outside. The damping force generation mechanism includes a damping valve for generating the damping force, a pilot chamber for applying a pilot pressure by the operating fluid to the damping valve, and a pump for at least supplying or discharging the operating fluid to or from the pilot chamber.

14 Claims, 6 Drawing Sheets

SHOCK ABSORBER AND SUSPENSION APPARATUS

BACKGROUND OF THE INVENTION

1. Technical Field

The present invention relates to a shock absorber and a suspension apparatus effectively usable to damp vibrations of, for example, an automobile.

2. Background Art

Generally, a vehicle, such as a two-wheeled or four wheeled motor vehicle, includes a hydraulic shock absorber disposed between a wheel side and a vehicle body side, and is configured to damp, for example, vertical vibrations generated when the vehicle is running by the shock absorber. There is known one type of such a shock absorber called semi-active suspension apparatus configured to variably control a damping force (for example, refer to Japanese Patent Public Disclosure No. 2009-281584).

The semi-active suspension apparatus as a conventional shock absorber can variably control a damping force by controlling a hydraulic flow in a cylinder, thereby realizing energy conservation and a compact structure. However, the semi-active suspension apparatus cannot generate a wide range of damping forces compared to an active suspension apparatus configured to supply hydraulic fluid from the outside into a cylinder and discharge the hydraulic fluid from the cylinder to the outside, which leads to the necessity of further improvement of the semi-active suspension apparatus still now.

SUMMARY OF THE INVENTION

An object of the present invention is to provide a shock absorber and a suspension apparatus capable of generating a wide range of damping forces while keeping energy conservation.

According to an aspect of the present invention, a shock absorber includes: at least one cylinder apparatus including a cylinder sealing containing operating fluid, a piston slidably fittedly inserted in the cylinder to divide an interior of the cylinder into two chambers, and a piston rod coupled to the piston and extending to an outside of the cylinder; and at least one damping force generation mechanism connected to the cylinder apparatus, and capable of generating a damping force to be applied to a flow of the operating fluid caused by a movement of the piston and adjusting the damping force from the outside. The damping force generation mechanism includes a damping valve for generating the damping force, a pilot chamber for applying a pilot pressure by the operating fluid to the damping valve, and a pump for at least supplying or discharging the operating fluid to or from the pilot chamber.

Further, according another aspect of the present invention, a suspension apparatus includes the above-described shock absorber, which is configured to be disposed between a vehicle body and a wheel of a vehicle, a controller for controlling the damping force generation mechanism of the shock absorber, and an upstream pressure detector capable of detecting a pressure at an upstream side of the damping valve. The controller controls the pump based on a detection result of the upstream pressure detector.

PREFERRED EMBODIMENT OF THE INVENTION

Hereinafter, shock absorbers and suspension apparatuses according to exemplary embodiments of the present invention will be described in detail with reference to the accompanying drawings based on an example in which they are employed as a hydraulic shock absorber for a vehicle.

Figure 1:
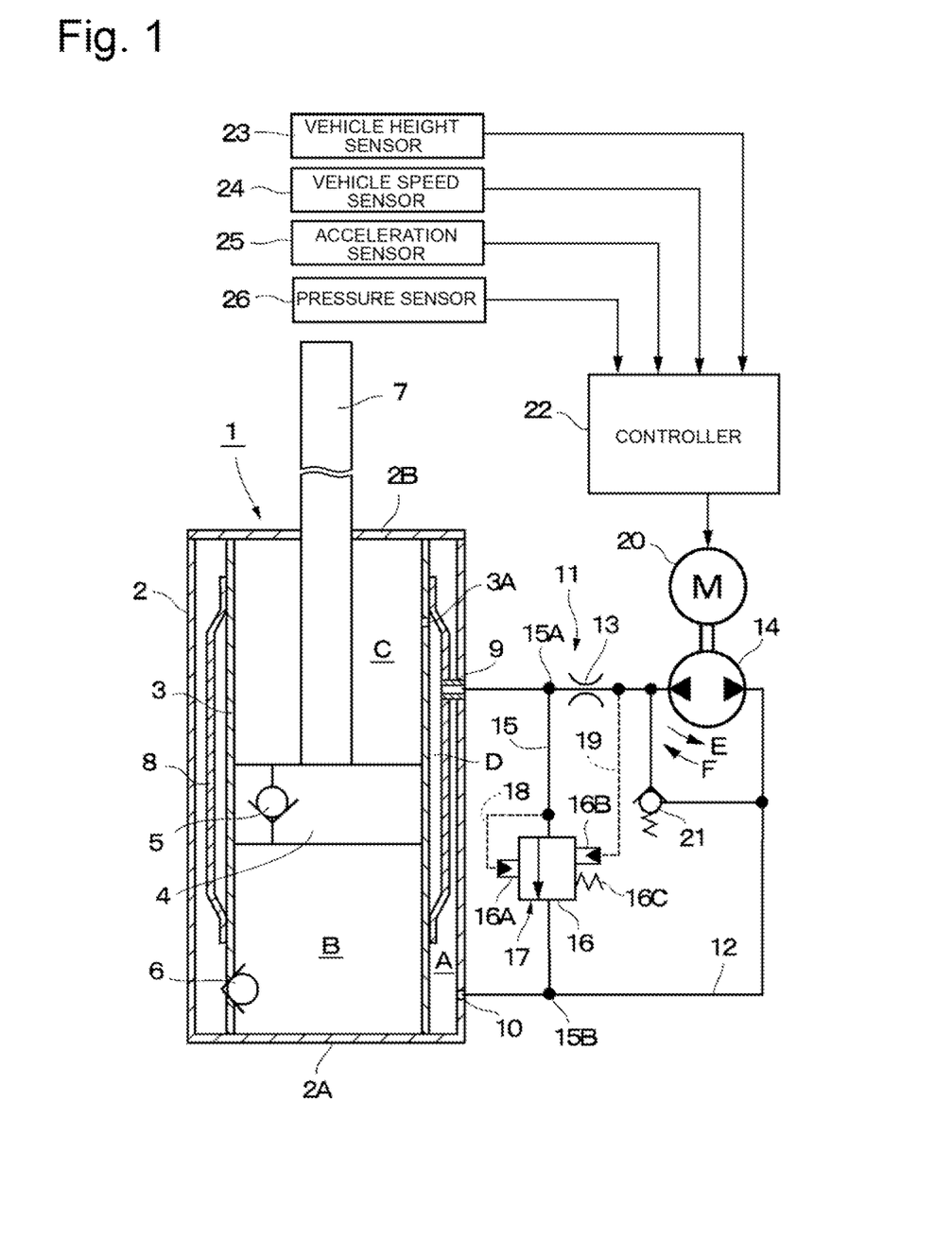
FIG. 1 illustrates an overall configuration of a hydraulic shock absorber and a suspension apparatus according to a first embodiment of the present invention.
Figure 2:
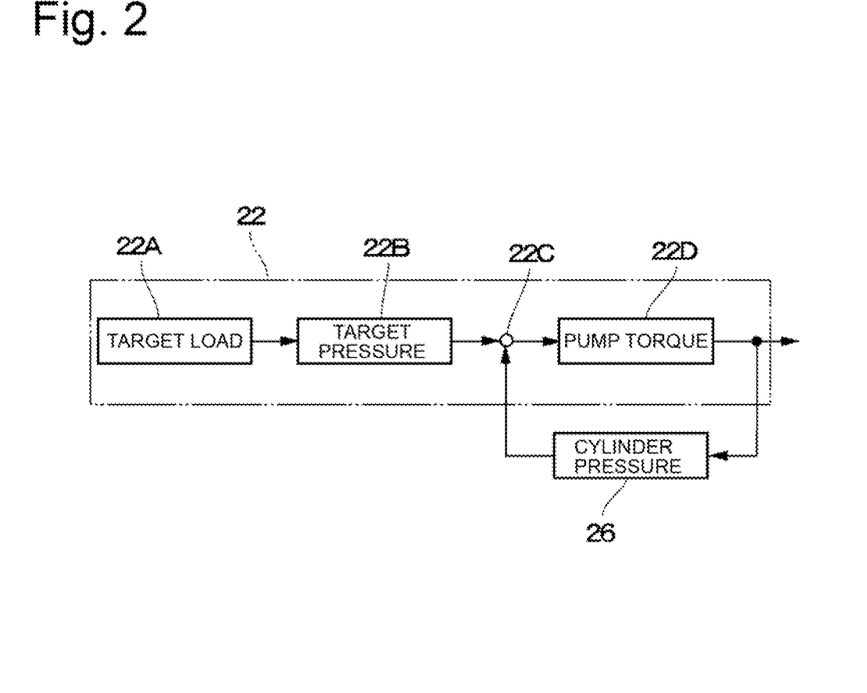
FIG. 2 is a block diagram illustrating a pump torque calculation circuit of a controller illustrated in FIG. 1.
Figure 3:
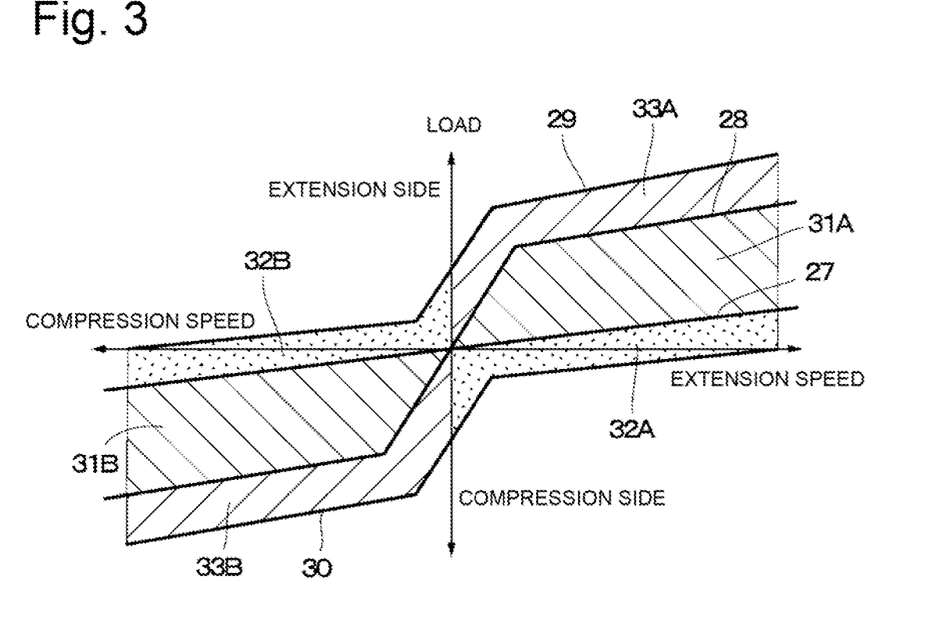
FIG. 3 illustrates characteristic lines of the characteristic of a damping force generated by the hydraulic shock absorber illustrated in FIG. 1.

FIGS. 1 to 3 illustrate a first embodiment of the present invention. In the figures, reference numeral 1 denotes a hydraulic cylinder as an example of at least one cylinder apparatus of the present invention and constituting a main body of a hydraulic shock absorber, and reference numeral 2 denotes a bottomed cylindrical outer tube constituting an outer shell of the hydraulic cylinder 1. The lower end side of the outer tube 2, which corresponds to one end side, is closed to define a bottom portion 2A. The upper end side of the outer tube 2, which corresponds to the other end side, is closed by a cover portion 2B. A rod guide, a seal (not-illustrated), and the like for slidably supporting a piston rod 7, which will be described later, are disposed at the inner circumferential side of the cover portion 2B.

Reference numeral 3 denotes an inner tube as a cylinder coaxially disposed in the outer tube 2. The inner tube 3 sealingly contains hydraulic fluid as operating fluid therein. The operating fluid may be embodied by not only hydraulic fluid and oil but also fluid such as water provided with an additive agent. An annular reservoir chamber A, which constitutes a reservoir, is defined between the outer tube 2 and the inner tube 3. Gas, together with the above-described hydraulic fluid, is sealingly contained in the reservoir chamber A. The gas may be air having an atmospheric pressure, or may be other gas such as compressed nitrogen gas. Further, a hydraulic hole 3A is radially penetratingly formed at a certain position along the longitudinal direction (axial direction) of the inner tube 3 to establish constant communication between an annular hydraulic chamber D and a rod-side hydraulic chamber C, which will be described later.

Reference numeral 4 denotes a piston slidably fittedly inserted in the inner tube 3. The piston 4 divides the interior of the inner tube 3 into two chambers, namely, a bottom-side hydraulic chamber B as a lower chamber and the rod-side hydraulic chamber C as an upper chamber. A unidirectional valve 5 is disposed at the piston 4. The unidirectional valve 5 allows a flow of the hydraulic fluid from the bottom-side hydraulic chamber B to the rod-side hydraulic chamber C, but on the contrary, prohibits a flow of the hydraulic fluid from the rod-side hydraulic chamber C to the bottom-side hydraulic chamber B. The piston 4 may have a relief valve which allows a flow of the hydraulic fluid from the rod-side hydraulic chamber C to the bottom-side hydraulic chamber B when the differential pressure between the rod-side hydraulic chamber C and the bottom-side hydraulic chamber B exceeds a predetermined pressure, but on the contrary, prohibits a flow of the hydraulic fluid from the bottom-side hydraulic chamber B to the rod-side hydraulic chamber C.

A bottom-side unidirectional valve 6 is disposed at the lower end side of the inner tube 3 between the reservoir chamber A and the bottom-side hydraulic chamber B. The unidirectional valve 6 allows a flow of the hydraulic fluid from the reservoir chamber A to the bottom-side hydraulic chamber B, but on the contrary, prohibits a flow of the hydraulic fluid from the bottom-side hydraulic chamber B to the reservoir chamber A. At the lower end side of the inner tube 3, there may be provided a relief valve which allows a flow of the hydraulic fluid from the bottom-side hydraulic chamber B to the reservoir chamber A when the differential pressure between the bottom-side hydraulic chamber B and the reservoir chamber A exceeds a predetermined pressure, but on the contrary, prohibits a flow of the hydraulic fluid from the reservoir chamber A to the bottom-side hydraulic chamber B.

When the piston 4 is slidably displaced downward during a compression stroke of the piston rod 7, which will be described later, the unidirectional valve 5 disposed at the piston 4 is opened and the unidirectional valve 6 at the bottom side is closed. On the other hand, when the piston 4 is slidably displaced upward during an extension stroke of the piston rod 7, the unidirectional valve 5 disposed at the piston 4 is closed and the unidirectional valve 6 at the bottom side is opened.

Reference numeral 7 denotes the piston rod axially extending in the inner tube 3. The lower end side of the piston rod 7, which corresponds to one end side, is inserted in the inner tube 3, and is fixedly attached to the piston 4. Further, the upper end side of the piston rod 7, which corresponds to the other end side, protrudes so as to extend to the outside of the outer tube 2 and the inner tube 3 via the above-described rod guide, the cover portion 2B, and the like.

Reference numeral 8 denotes an intermediate tube disposed between the outer tube 2 and the inner tube 3. The intermediate tube 8 is attached to the outer circumferential side of the inner tube 3 via upper and lower seal members (both are not illustrated), and the like. The intermediate cylinder 8 defines therein the annular hydraulic chamber D extending so as to surround the whole outer circumferential side of the inner tube 3. The annular hydraulic chamber D is configured as a hydraulic chamber independent of the reservoir chamber A. The annular hydraulic chamber D is in constant communication with the rod-side hydraulic chamber C via the hydraulic hole 3A radially formed through the inner tube 3. The annular hydraulic chamber D may have any another shape than an annular shape as long as it can function as a passage.

A joint 9 is formed between the intermediate tube 8 and the outer tube 2 so as to radially extend therebetween. This joint 9 constitutes a part of a hydraulic passage for transmitting the hydraulic fluid in the annular hydraulic chamber D and the rod-side hydraulic chamber C toward a communication pipe line 12 of a damping force generation mechanism 11, which will be described later. A port 10 is formed at the lower end side of the outer tube 2 so as to allow a supply and discharge of the hydraulic fluid between the reservoir chamber A and the damping force generation mechanism 11, which will be described later.

Reference numeral 11 denotes the damping force generation mechanism employed in the first embodiment. As illustrated in FIG. 1, the damping force generation mechanism 11 includes the communication pipe line 12 for establishing communication between the joint 9 and the port 10 outside the outer tube 2, a pilot orifice 13 disposed at a certain position along the communication pipe line 12, a pump 14 disposed at a certain position along the communication pipe line 12 downstream of the pilot orifice 13, a bypass pipe line 15 connected to the communication pipe line 12 at branch points 15A and 15B to allow the pilot orifice 13 and the pump 14 to be bypassed, a relief valve 16 disposed at a certain position along the bypass pipe line 15 and including pilot chambers 16A and 16B, a motor 20 which will be described later, and an excessive load application prevention valve 21.

Among these components, the relief valve 16 constitutes a damping valve 17, which is one of essential components of the present invention, together with the pilot orifice 13. The pressure at the upstream side of the pilot orifice 13 (i.e., the pressure in the rod-side hydraulic chamber C and the joint 9) is supplied into the pilot chamber 16A of the relief valve 16 as a pilot pressure via a pilot pipe line 18. The relief valve 16 is driven by this pilot pressure in a valve opening direction against, for example, a pressure setting spring 16C.

The pressure at the downstream side of the pilot orifice 13 (i.e., the pressure at the pump 14 side) is supplied into the pilot chamber 16B of the relief valve 16 as a pilot pressure via a pilot pipe line 19. The relief valve 16 is driven by this pilot pressure together with the pressure setting spring 16C in a valve closing direction. In other words, the pilot chamber 16B serves to apply the pilot pressure to the relief valve 16 of the damping valve 17 via the pilot pipe line 19.

In this way, the relief valve 16 is constantly biased by the pressure setting spring 16C in the valve closing direction, and is maintained in a closed state as long as the pilot pressure supplied to the pilot chamber 16A is lower than the total pressure value of the pilot pressure of the pilot chamber 16B and the biasing force applied by the pressure setting spring 16C. However, when the pilot pressure supplied to the pilot chamber 16A exceeds the total pressure value of the pilot pressure of the pilot chamber 16B and the biasing force applied by the pressure setting spring 16C, the relief valve 16 is opened, thereby allowing a flow of the hydraulic fluid from the branch point 15A to the branch point 15B (i.e., the reservoir chamber A) of the bypass pipe line 15. A relief valve 16 may be provided with a fixed orifice that allows a slight flow of the hydraulic fluid even under a valve closed state, depending on a desired damping force characteristic. Further, an opposing spring to the pressure setting spring 16C may be provided so as to slightly open the relief valve 16 when the pilot pressure in the pilot chamber 16B is extremely low.

The pump 14 is a bidirectional pump configured to be driven to rotate in a normal direction and a reverse direction (the directions indicated by arrows E and F) by a motor 20 serving as a drive source. The pump 14 can supply the hydraulic fluid to the reservoir chamber A and discharge the hydraulic fluid from the reservoir chamber A, as well as can supply the hydraulic fluid to the pilot chamber 16B and discharge the hydraulic fluid from the pilot chamber 16B. When the pump 14 is rotated in the direction indicated by the arrow E illustrated in FIG. 1, the pump 14 discharges the hydraulic fluid in the pilot orifice 13 and the pilot pipe line 19 toward the branch point 15B, thereby reducing the pilot pressure in the pilot pipe pine 19 and the pilot chamber 16B. On the contrary, when the pump 14 is rotated in the direction indicated by the arrow F illustrated in FIG. 1, the pump 14 supplies the hydraulic fluid at the branch point 15B (i.e., the reservoir chamber A) side to the pilot orifice 13 and the pilot pipe line 19, thereby increasing the pilot pressure in the pilot pipe line 19 and the pilot chamber 16B.

Reference numeral 21 denotes the excessive load application prevention valve for the pump 14. The excessive load application prevention valve 21 is connected to the connection pipe line 12 at the upstream and downstream sides of the pump 14 so as to be arranged in parallel with the pump 14. The excessive load application prevention valve 21 is opened when, for example, the pressure in the rod-side hydraulic chamber C (the annular hydraulic chamber D) and the pressure at the pilot orifice 13 side exceed a predetermined pressure value (excessive pressure). At this time, the excessive load application prevention valve 21 functions as a safety valve for releasing the excessive pressure toward the branch point 15B (i.e., the reservoir chamber A).

More specifically, when the relief valve 16 is closed in such a state that a relief setting pressure higher than the above-described pressure value (excessive pressure) is set to the relief valve 16, the excessive load application prevention valve 21 is opened to prevent an excessive load from being applied to the pump 14 due to the excessive pressure. Except for that, the excessive load application prevention valve is maintained in a closed state. For example, characteristic lines 29 and 30 illustrated in FIG. 3, which will be described later, are characteristic determined based on opening of the excessive load application prevention valve 21. Generation of a higher damping force that the characteristic lines 29 and 30 may result in application of an excessive load onto the pump 14 to cause a failure of the pump 14, and the excessive load application prevention valve 21 is configured to be opened to prevent this state. The excessive load application prevention valve 21 may be replaced with, for example, a mechanism capable of stopping the pump 14 upon achievement of a predetermined pressure.

Reference numeral 22 denotes a controller as a control apparatus constituted by, for example, a micro computer. As illustrated in FIG. 1, the controller 22 is connected to, for example, a vehicle height sensor 23, a vehicle speed sensor 24, a vertical acceleration sensor 25, and a pressure sensor 26. The output side of the controller 22 is connected to, for example, the motor 20. The controller 22 includes a storage unit (not illustrated) constituted by, for example, a ROM, a RAM, and a non-volatile memory. Further, the controller 22 includes, for example, a pump torque calculation processing circuit illustrated in FIG. 2.

As illustrated in FIG. 2, the pump torque calculation processing circuit of the controller 22 includes, for example, a target load calculation unit 22A, a target pressure calculation unit 22B, a deviation calculation unit 22C, and a pump torque calculation unit 22D. The target load calculation unit 22A calculates a target load (a target damping force) that should be generated at the inner tube 3 of the hydraulic cylinder 1 to stabilize the vehicle body based on detection signals from, for example, the vehicle height sensor 23, the vehicle speed sensor 24, and the vertical acceleration sensor 25 (more precisely, including signals related to a movement of the vehicle body, such as a steering angle of the vehicle, a brake hydraulic pressure, and navigation information).

The target pressure calculation unit 22B calculates a target pressure at the inner tube 3, which corresponds to the calculated target load. Generally, a suspension spring (for example, a pneumonic spring for an air suspension) is disposed between the vehicle body and the hydraulic cylinder 1, so that the target pressure calculation unit 22B calculates the target pressure that should be generated at the inner tube 3 by using a calculation equation in consideration of, for example, the outer diameters of the piston 4 and the piston rod 7, the diameter of the hydraulic hole 3A, and the area of the passage through the relief valve 16, after subtracting a pressure corresponding to a load that the suspension spring accepts.

The deviation calculation unit 22C calculates a deviation between a cylinder pressure actually detected by the pressure sensor 26 (for example, the pressure in the annular hydraulic chamber D and the rod-side hydraulic chamber C, which is detected based on the position of the joint 9) and the target pressure calculated by the target pressure calculation unit 22B. The pump toque calculation unit 22D calculates a control current value to be output to the motor 20 as a pump torque so as to reduce the deviation at this time to fall within a predetermined range around a predetermined value.

The vehicle height sensor 23 detects a vertical height position of the vehicle body side relative to the wheel side of the vehicle. The vehicle speed sensor 24 detects a running speed of the vehicle. The vertical acceleration sensor 25 detects an acceleration (sprung acceleration) when the vehicle body side is displaced vertically relative to the wheel side of the vehicle. The pressure sensor 26 constitutes an upstream pressure detector capable of detecting the pressure at the upstream side of the pilot orifice 13 of the damping valve 17, and is disposed at, for example, the position of the joint 9.

The hydraulic shock absorber and the suspension apparatus according to the first embodiment is configured as mentioned above, and they functions as follows.

First, the hydraulic cylinder 1 is disposed in such a manner that the upper end side of the piston rod 7 is attached to the vehicle body side of the vehicle, and the bottom 2A of the outer tube 2 is attached to the wheel side. When the vehicle is running, generation of vertical vibrations due to, for example, an uneven road surface, and generation of lateral vibrations such as a pitching motion and a rolling motion lead to a displacement of the piston rod 7 such as extension from the outer tube 2 and retraction into the outer tube 2, thereby leading to a vertical movement of the piston 4 in the inner tube 3.

When the piston 4 is slidably displaced upward during an extension stroke of the piston rod 7, the unidirectional valve 5 disposed at the piston 4 is closed while the unidirectional valve 6 at the bottom side is opened. When the piston 4 is slidably displaced downward during a compression stroke of the piston rod 7, the unidirectional valve 5 disposed at the piston 4 is opened while the unidirectional valve 6 at the bottom side is closed.

Therefore, during either an extension stroke or a compression stroke of the piston rod 7, a vertical movement of the piston 4 is accompanied by a flow of the hydraulic fluid in the rod-side hydraulic chamber C toward the communication pipe line 12 of the damping force generation mechanism 11 via the hydraulic hole 3A of the inner tube 3, the annular hydraulic chamber D, and the joint 9. This damping force generation mechanism 11 can generate a damping force changing or increasing/reducing according to a flow amount of the hydraulic fluid through the communication pipe line 12 at this time by the damping valve 17 (the pilot orifice 13 and the relief valve 16), thereby damping vibrations of the vehicle.

More specifically, after being transmitted through the rod-side hydraulic chamber C, the annular hydraulic chamber D, and the joint 9, the hydraulic fluid is divided at the branch point 15A into flows in the two directions, one of which is transmitted toward the relief valve 16 via the bypass pipe line 15, the other of which is transmitted through the pilot orifice 13. At this time, the valve opening/closing characteristic of the relief valve 16 varies depending on the differential pressure between the upstream side and the downstream side of the pilot orifice 13. After being transmitted through the pilot orifice 13, the hydraulic fluid enters the pump 14 (i.e., pump 14 can be rotated according to a flow of the hydraulic fluid in addition to being driven to be rotated in the both directions by the motor 20). After being transmitted through the pump 14, the hydraulic fluid joins the hydraulic fluid transmitted through the relief valve 16 at the branch point 15B of the bypass pipe line 15. Then, the hydraulic fluid is returned to the reservoir chamber A via the port 10.

When the pressure at the downstream side of the pilot orifice 13, i.e., the pilot pressure in the pilot pipe line 19 is low, the relief setting pressure of the relief valve 16 is low, whereby the relief valve 16 can be opened against a small resistance. Therefore, at this time, the hydraulic fluid transmitted from the branch point 15A into the bypass pipe line 15 can pass through the opened relief valve 16 with a relativity small pressure loss. The remaining hydraulic fluid is returned to the reservoir chamber A through the pilot orifice 13 and the pump 14.

On the other hand, when the pressure at the downstream side of the pilot orifice 13, i.e., the pilot pressure in the pilot pipe line 19 is high, the relief setting pressure of the relief valve 16 is high, whereby the relief valve 16 should be opened against a large resistance. Therefore, most of the hydraulic fluid transmitted through the joint 9 is returned to the reservoir chamber A through the pilot orifice 13 and the pump 14 without flowing from the branch point 15A toward the bypass pipe line 15 (relief valve 16).

Next, controlling the hydraulic cylinder 1 to function as an active suspension will be described with reference to FIG. 3. In FIG. 3, the horizontal axis represents the piston speed (the speed of an extension stroke and the speed of a compression stroke), and the vertical axis represents the load (i.e., an extension-side damping force and a compression-side damping force). The characteristic lines 27, 28, 29, and 30 represent damper characteristics.

The hatched region between the characteristic lines 27 and 28 corresponds to an extension-side semi-active region 31A and a compression-side semi-active region 31B. In these semi-active regions 31A and 31B, the pump 14 is driven to be rotated in the directions indicated by the arrows E and F with use of the motor 20 to control the pilot pressure in the pilot pipe line 19 so as to be reduced or increased, thereby variably adjusting the resistance (the relief setting pressure) against opening of the relief valve 16 to change the damper characteristic from the soft characteristic generating a low damping force (the characteristic line 27) to the hard characteristic generating a high damping force (the characteristic line 28) in the semi-active regions 31A and 31B.

In these semi-active regions 31A and 31B, the hydraulic fluid discharged from the rod-side hydraulic chamber C in the inner tube 3 via the annular hydraulic chamber D and the joint 9 by an extension or compression movement of the piston rod 7 is divided into two flows, one of which is transmitted toward the relief valve 16, the other of which is transmitted into the pump 14 via the pilot orifice 13. At this time, the resistance against the hydraulic fluid transmitted through the pump 14 corresponds to the pump torque, and the pilot pressure in the pilot pipe line 19 is variably controlled by controlling a rotation of the motor 20 according to the processing of calculating the pump torque as illustrated in FIG. 12.

Next, an operation to generate forces that cannot be generated in the semi-active regions 31A and 31B (the damping forces in super soft regions 32A and 32B and super hard regions 33A and 33B) will be described.

[Extension-Side Super Soft Region 32A]

To realize an extension-side damping force softer than the soft characteristic (the characteristic line 27), which falls in the super soft region 32A, i.e., the doted region between the characteristic lines 27 and 30 illustrated in FIG. 3, the pump 14 is rotated in the arrow E direction illustrated in FIG. 1 by the motor 20 at the number of rotations greater than the flow amount of the hydraulic fluid supplied from the annular hydraulic chamber D into the communication pipe line 12 of the damping force generation mechanism 11 via the joint 9.

This operation makes it possible to not only reduce the pilot pressure in the pilot pipe line 19 but also discharge the hydraulic fluid in the rod-side hydraulic chamber C toward the communication pipe line 12 and the reservoir chamber A. As a result, it is possible to actively facilitate the extension stroke of the hydraulic cylinder 1 (for example, the piston rod 7), thereby reducing the extension-side damping force. For the extension-side super soft region 32A, the pump 14 is rotated in the normal direction as indicated by the arrow E in FIG. 1, and therefor the torque direction is also the normal direction.

[Extension-Side Super Hard Region 33A]

To realize an extension-side damping force harder than the hard characteristic (the characteristic line 28), which falls in the super hard region 33A, i.e., the hatched region between the characteristic lines 28 and 29 illustrated in FIG. 3, the number of rotations of the pump 14 in the arrow E direction illustrated in FIG. 1 is reduced by slowing down the rotation of the motor 20, in order to increase the pilot pressure in the pilot pipe line 19 to be higher than that in the semi-active region 31A. Further, the motor 20 is rotated in the reverse direction to drive the pump 14 to rotate in the arrow F direction to supply the hydraulic fluid in the reservoir chamber A to the communication pipe line 12, thereby further increasing the pilot pressure and supplying the hydraulic fluid into the rod-side hydraulic chamber C via the pilot orifice 13, the joint 9, and the annular hydraulic chamber D.

As a result, the flow amount leaking through the relief valve 16 is compensated for by the pump 14, thereby blocking the stroke of the hydraulic cylinder 1 (for example, the piston rod 7), and even causing a compression stroke of the hydraulic cylinder 1 (for example, the piston rod 7) by supplying the hydraulic fluid to the rod-side hydraulic chamber C. For the extension-side super hard region 33A, the rotational direction of the pump 14 is changed from the normal direction indicated by the arrow E to the reverse direction indicated by the arrow F in FIG. 1. The direction of the torque remains reversed.

[Compression-Side Super Soft Region 32B]

To realize a compression-side damping force softer than the soft characteristic, which falls in the super soft region 32B, i.e., the doted region between the characteristic lines 28 and 29 illustrated in FIG. 3, contrary to the operation for reducing the pilot pressure, the pump 14 should be rotated in the reverse direction indicated by the arrow F to supply the hydraulic fluid in the reservoir chamber A to the communication pipe line 12, thereby supplying this hydraulic fluid to the rod-side hydraulic chamber C via the pilot orifice 13, the joint 9, and the annular hydraulic chamber D to actively facilitate the compression stroke of the hydraulic cylinder 1 (for example, the piston rod 7).

[Compression-Side Super Hard Region 33B]

To realize a compression-side damping force harder than the hard characteristic, which falls in the super hard region 33B, i.e., the hatched region between the characteristic lines 28 and 30 illustrated in FIG. 3, contrary to the operation for increasing the pilot pressure, the pump 14 should be rotated in the normal direction indicated by the arrow E to reduce the pilot pressure, thereby discharging the hydraulic fluid in the rod-side hydraulic chamber C toward the communication pipe line 12 and the reservoir chamber A to cause even an extension stroke of the hydraulic cylinder 1 (for example, the piston rod 7).

In this case, the circuit configuration of the damping force generation mechanism 11 illustrated in FIG. 1 is not so effective for compression-side active control, and therefore it is efficient to control a damping force within the semi-active range (i.e., the semi-active region 31B illustrated in FIG. 3) during a compression stroke. In a case where the hydraulic cylinder 1 is configured in such a manner that a communication hole is provided at the piston lower chamber side (for example, the bottom-side hydraulic chamber B) (for example, the hydraulic hole 3A illustrated in FIG. 1 is replaced with a hydraulic hole for establishing constant communication between the bottom-side hydraulic chamber B and the annular hydraulic chamber D), and the directions of the unidirectional valves 5 and 6 are reversed, contrary to the above-described configuration, it is possible to increase the range of the variation of a compression-side damping force to reach the active range, but it becomes necessary to reduce the control range of an extension-side damping force to fall within the semi-active range.

In either case, unlike the control of the pilot pressure with use of the solenoid valve according to the conventional technique disclosed in the above-described patent literature, Japanese Patent Public Disclosure No. 2009-281584, according to the technique according to the present embodiment, the pilot pressure is changed by pressure control with use of a rotation of the pump 14, and therefor can be actively increased with use of the pump 14 even when the piston 4 and the piston rod 7 has an extension/compression stroke at a low speed to cause only a pilot flow of a small amount, thereby increasing the range of the variation of a damping force from a low speed stroke.

In this way, according to the first embodiment, the damping force generation mechanism 11, which can variably control a damping force generated at the hydraulic cylinder 1, includes, for example, the communication pipe line 12 for establishing communication between the joint 9 and the port 10 of the hydraulic cylinder 1 outside the outer tube 2, the pilot orifice 13 and the pump 14 disposed at certain positions along the communication pipe line 12, the bypass pipe line 15 connected to the communication pipe line 12 at the branch points 15A and 15B to allow the pilot orifice 13 and the pump 14 to be bypassed, and the relief valve 16 disposed at a certain position along the bypass pipe line 15 and including the pilot chambers 16A and 16B.

Then, the motor 20 is driven by a control signal from the controller 22 to rotate the pump 14 in the normal or reverse direction, thereby variably controlling the relief setting pressure of the relief valve 16 to enable the hydraulic cylinder 1 to function as an active suspension apparatus. In other words, it is possible to increase the controllable range of an extension/compression-side damping force (load) generated at the hydraulic cylinder 1 to cover not only the semi-active regions 31A and 31B but also the super soft regions 32A and 32B and the super hard regions 33A and 33B as indicated by the characteristic lines 27, 28, 29, and 30 illustrated in FIG. 3.

Therefore, according to the first embodiment, the pressure is controlled only by rotating the pump 14 in the both directions by the motor 20 without using the solenoid valve unlike the conventional technique, whereby the functionality of a semi-active suspension apparatus and an active suspension apparatus can be realized with a compact structure and a low-consumption power source. As a result, a size reduction of the whole apparatus and energy saving can be achieved.

Further, according to the first embodiment, the pump 14 can be rotated by the hydraulic fluid transmitted from the rod-side hydraulic chamber C of the inner tube 3 via the communication pipe line 12. In this case, the motor 20 is also rotated according to the rotation of the pump 14, which enables regeneration for power generation and power charging by a rotation of the motor 20.

Next, a second embodiment of the present invention will be described with reference to FIG. 4. The second embodiment is characterized in that the reservoir for compensating for the volume of the rod entering the cylinder is disposed outside the cylinder and the piston rod, thereby improving the mountability to the vehicle. In the following description of the second exemplary embodiment, like elements will be identified by the same reference numerals as the first embodiment, and the descriptions thereof will be omitted.

Figure 4:
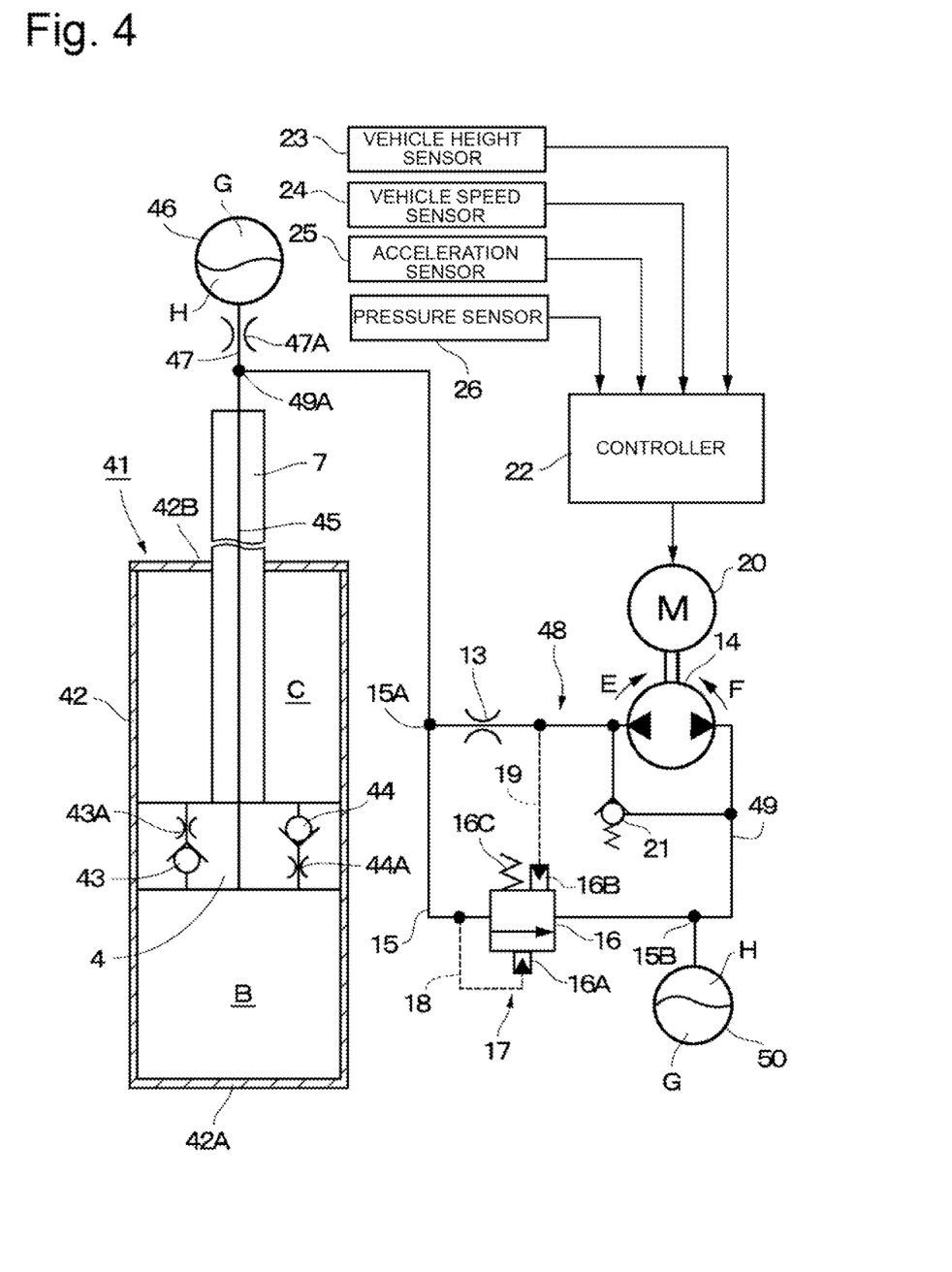
FIG. 4 illustrates an overall configuration of a hydraulic shock absorber and a suspension apparatus according to a second embodiment of the present invention.

In FIG. 4, reference numeral 41 denotes a hydraulic cylinder employed by the second embodiment. This hydraulic cylinder 41 constitutes the main body of the hydraulic shock absorber, and includes a piston 4 and a piston rod 7, like the hydraulic cylinder 1 employed by the first embodiment. However, in this case, the hydraulic cylinder 41 is configured as a single tube type, for example, using only a tube 42 as a cylinder. As illustrated in FIG. 4, the piston 4 is slidably fittedly inserted in the tube 42.

The lower end side of the tube 42, which corresponds to one end side, is closed to define a bottom portion 42A. The upper end side of the tube 42, which corresponds to the other end side, is closed by a cover portion 42B. A rod guide, a seal (not illustrated), and the like are disposed at the inner circumferential side of the cover portion 42B for slidably supporting the piston rod 7. The tube 42 sealingly contains therein hydraulic fluid as operating fluid. The operating fluid may be embodied by not only hydraulic fluid and oil but also fluid such as water provided with an additive agent.

Reference numerals 43 and 44 denote an extension-side damping force valve and a compression-side damping force valve disposed at the piston 4, respectively. The damping force valves 43 and 44 are constituted by, for example, extension-side and compression-side disk valves (not illustrated) disposed on the upper surface and the lower surface of the piston 4. The damping force valves 43 and 44 include restrictors 43A and 44A as will be described below, and function as unidirectional valves, respectively.

More specifically, the extension-side damping force valve 43 is opened as a unidirectional valve during an extension stroke of the piston rod 7, and is closed during a compression stroke to prohibit a flow of the hydraulic fluid from the bottom-side hydraulic chamber B to the rod-side hydraulic chamber C. The compression-side damping force calve 44 is opened as a unidirectional valve during a compression stroke of the piston rod 7, and is closed during an extension stroke to prohibit a flow of the hydraulic fluid from the rod-side hydraulic chamber C to the bottom-side hydraulic chamber B.

During an extension stroke of the piston rod 7, the extension-side damping force valve 43 is opened to allow a flow of the hydraulic fluid from the rod-side hydraulic chamber C to the bottom-side hydraulic chamber B. At this time, a predetermined extension-side damping force is generated by the restrictor 43A. On the other hand, during a compression stroke of the piston rod 7, the compression-side damping force valve 44 is opened to allow a flow of the hydraulic fluid from the bottom-side hydraulic chamber B to the rod-side hydraulic chamber C. At this time, a predetermined compression-side damping force is generated by the restrictor 44A.

Reference numeral 45 denotes an axially extending hydraulic passage formed at the piston 4 and the piston rod 7.

The lower end side of the hydraulic passage 45, which corresponds to one end side, connected to the bottom-side hydraulic chamber B in the tube 42. The upper end side of the hydraulic passage 45, which corresponds to the other end side, extends to the protruding end side of the piston rod 7, and is connected to a first accumulator 46 via a restriction passage 47, which will be described later.

Reference numeral 46 denotes the first accumulator constituting a reservoir disposed at the protruding end side of the piston rod 7. The interior of the first accumulator 46 is divided into a gas chamber G and a hydraulic chamber H. The hydraulic chamber H is connected to the hydraulic passage 45 of the piston rod 7 via the restriction passage 47. Gas is sealingly contained in the gas chamber G. This gas may be air having an atmospheric pressure, or may be other gas such as compressed nitrogen gas. The gas chamber G is compressed according to a hydraulic fluid amount supplied into the hydraulic chamber H, thereby realizing accumulation of the first accumulator 46, which then functions as an accumulator as well as a reservoir.

Further, a restrictor 47A is disposed at a certain position along the restriction passage 47 between the hydraulic chamber H of the first accumulator 46 and a connection point 49A, which will be described later. This restrictor 47A functions to restrict the hydraulic fluid transmitted through the restriction passage 47, i.e., the hydraulic fluid supplied into or discharged from the hydraulic chamber H of the first accumulator 46, and generates a damping force approximately proportional to the flow amount during both a compression stroke and an extension stroke.

Reference numeral 48 denotes a damping force generation mechanism employed by the second embodiment. The damping force generation mechanism 48 is configured in an approximately similar manner to the damping force generation mechanism 11 employed by the first embodiment, and includes a pilot orifice 13, a pump 14, a bypass pipe line 15, a relief valve 16 including pilot chambers 16A and 16B, an excessive load application prevention valve 21 for the pump 14, and a communication pipe line 49.

However, a difference of the present embodiment from the first embodiment is that the communication pipe line 49 connects the bottom-side hydraulic chamber B in the tube 42 and the hydraulic chamber H in the first accumulator 46 to a hydraulic chamber H of a second accumulator 50, which will be described later. More specifically, one side of the communication pipe line 49 is in constant communication with the hydraulic passage 45 of the piston rod 7 at the connection point 49A. The other side of the communication pipe line 49 is connected to the second accumulator 50, which will be described later. The pilot orifice 13 and the pump 14 are disposed at certain positions along the communication pipe line 49. The excessive load application prevention valve 21 is connected to the communication pipe line 49 at the upstream side and downstream side of the pump 14 so as to be arranged in parallel with the pump 14.

The bypass pipe line 15 is connected to the communication pipe line 49 at branch points 15A and 15B to allow the pilot orifice 13 and the pump 14 to be bypassed. The pressure at the upstream side of the pilot orifice 13 (i.e., the pressure at the connection point 49A side) is supplied to the pilot chamber 16A of the relief valve 16 via the pilot pipe line 18 as a pilot pressure. The pressure at the downstream side of the pilot orifice 13 (i.e., the pressure at the pump 14 side) is supplied to the pilot chamber 16B of the relief valve 16 via the pilot pipe line 19 as a pilot pressure, in a similar manner to the first embodiment illustrated in FIG. 1.

Reference numeral 50 denotes the second accumulator employed by the second embodiment. Like the above-described first accumulator 46, the second accumulator 50 constitutes the reservoir, and the interior thereof is divided into a gas chamber G and a hydraulic chamber H. However, the hydraulic chamber H of the second accumulator 50 is connected to the other side of the communication pipe line 49, and is also connected to the bypass pipe line 15 at the branch point 15B.

When the pump 14 is rotated in a normal direction indicated by an arrow E, the hydraulic fluid is discharged from the bottom-side hydraulic chamber B and the hydraulic passage 45 into the hydraulic chamber H of the second accumulator 50 via the communication pipe line 49, and the pilot pressure in the pilot chamber 16B is reduced via the pilot pipe line 19. Then, after the relief valve 16 is opened, the hydraulic fluid is also discharged into the hydraulic chamber H of the second accumulator 50 via the bypass pipe line 15.

On the contrary, when the pump 14 is rotated in a direction indicated by an arrow F, the hydraulic fluid is supplied from the hydraulic chamber H of the second accumulator 50 toward the pilot orifice 13 and the pilot pipe line 19, and the pilot pressure in the pilot chamber 16B is increased via the pilot pipe line 19. Therefore, the relief valve 16 is set in a high-pressure state (i.e., the relief setting pressure is set to a high pressure), and is maintained in a closed state until the pilot pressure in the pilot pipe line 18 exceeds the setting value. At this time, the hydraulic fluid is supplied from the second accumulator 50 to the hydraulic passage 45 of the piston rod 7 via the connection point 49A of the communication pipe line 49.

In this way, according to the thus-configured second embodiment, when the piston 4 is displaced downward in the tube 42 during a compression stroke of the piston rod 7, the hydraulic fluid corresponding to the volume of the piston rod 7 entering in the tube 42 is discharged from the bottom-side hydraulic chamber B in the tube 42 toward the first accumulator 46 via the hydraulic passage 45 and the restriction passage 47, and is also discharged toward the accumulator 50 via, for example, the communication pipe line 49 of the damping force generation mechanism 48.

In this way, when the hydraulic fluid is discharged toward the second accumulator 50 during a compression stroke of the piston rod 7, the hydraulic fluid is transmitted to the second accumulator 50 through the pilot orifice 13, the pump 14, and the relief valve 16, in a similar manner to the above-described first embodiment. Therefore, the second embodiment can provide a similar advantageous effect as the first embodiment.

Further, when the piston 4 is displaced upward in the tube 42 during an extension stroke of the piston rod 7, the hydraulic fluid is discharged from the first accumulator 46 and the second accumulator 50 into the tube 42, and then this hydraulic fluid is supplied to the bottom-side hydraulic chamber B in the tube 42 to compensate for the hydraulic fluid corresponding to a reduction in the volume in the tube 42 (the volume of the piston rod 7 exiting from the tube 42) according to the extension of the piston rod 7. At this time, the hydraulic fluid transmitted from the second accumulator 50 toward the pilot orifice 13 through the communication pipe line 49 causes a rotation of the pump 14 in the arrow F direction.

Therefore, like the above-described first embodiment, it is possible to variably control the damping force characteristic by changing the rotation of the pump 14 (i.e., the pump torque) to increase or decrease a resistance against the hydraulic fluid. At this time, active control can be realized by driving the pump 14 by the motor 2 to rotate to supply or discharge the hydraulic fluid. In this way, the second embodiment can provide a similar advantageous effect as the first embodiment.

Especially, according to the second embodiment, the hydraulic passage 45 axially extending in the piston rod 7 is connected to the communication pipe line 49 at the protruding end side of the piston rod 7. Therefore, the damping force generation mechanism 48 can be disposed at the sprung side of the vehicle, thereby improving the mountability onto the vehicle.

Further, reducing the diameter of the restrictor 47A near the first accumulator 46 to be smaller than the pilot orifice 13 can further enhance the efficiency of variable control of the damping force characteristic. Further, preferably, the pressures sealingly contained in the accumulators 46 and 50, i.e., the pressures in the gas chambers G are maintained in a high state to prevent a negative pressure from being generated in the bottom-side hydraulic chamber B, which corresponds to the lower chamber of the piston 4.

Next, a third embodiment will be described with reference to FIG. 5. The third embodiment is characterized in that the reservoir for compensating for the hydraulic fluid corresponding to the volume of the rod entering the tube is disposed outside the cylinder and the piston rod, thereby improving the mountability onto the vehicle, and in addition, different relief valves (damping force valves) are prepared for an extension stroke and a compression stroke of the piston rod. In the following description of the third exemplary embodiment, like elements will be identified by the same reference numerals as the above-described second embodiment, and the descriptions thereof will be omitted.

Figure 5:
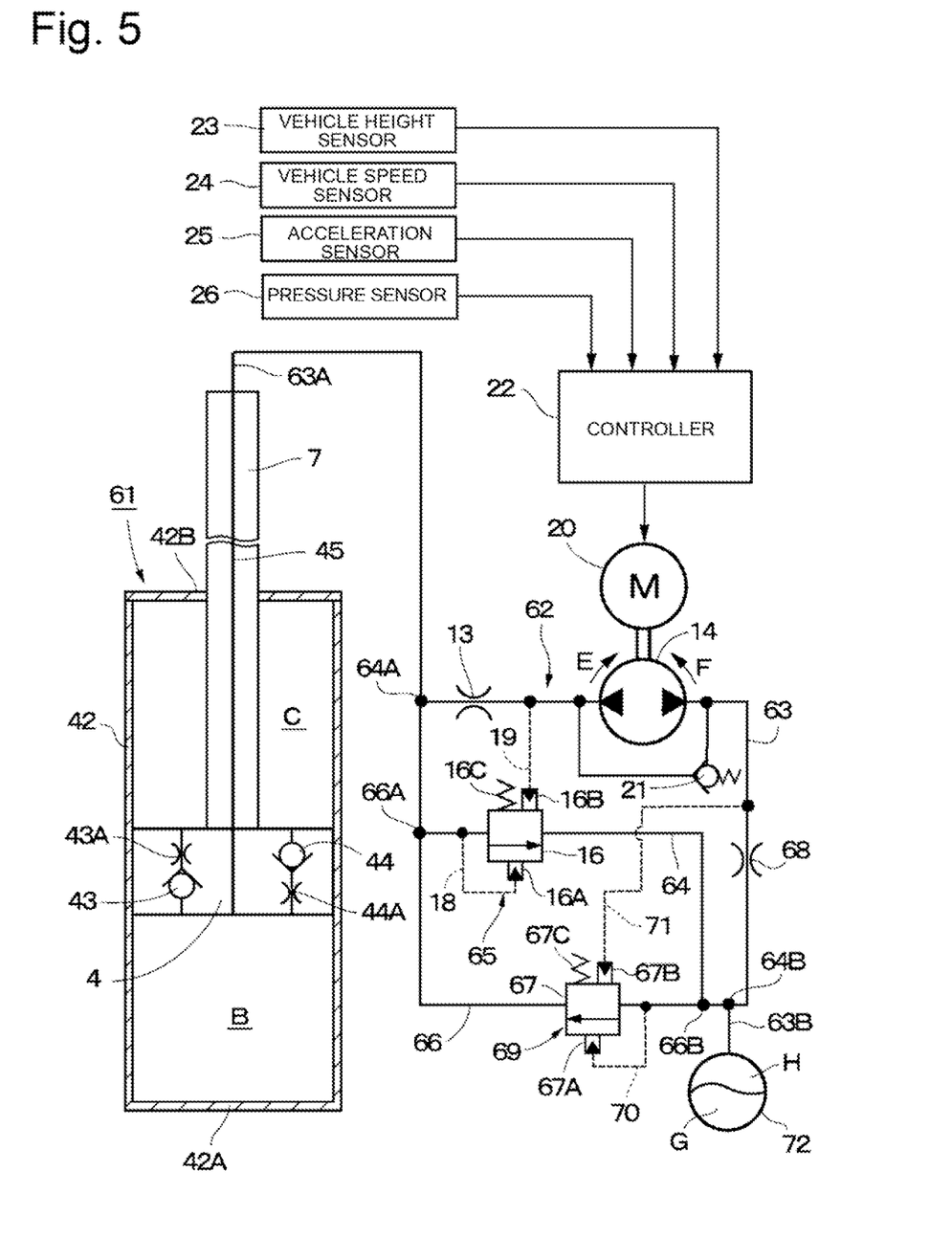
FIG. 5 illustrates an overall configuration of a hydraulic shock absorber and a suspension apparatus according to a third embodiment of the present invention.

In FIG. 5, reference numeral 61 denotes a hydraulic cylinder employed by the third embodiment. This hydraulic cylinder 61 is configured in a similar manner to the hydraulic cylinder 41 employed by the second embodiment. The hydraulic cylinder 61 includes, for example, a piston 4, a piston rod 7, a single type tube 42, an extension-side damping force valve 43, a compression-side damping force valve 44, and a hydraulic passage 45. However, according to the hydraulic cylinder 61 in the present embodiment, the hydraulic passage 45 of the piston rod 7 is directly connected to one end side 63A of a communication pipe line 63 which will be described later, and the first accumulator 46 and the restriction passage 47 are removed, which are differences from the second embodiment.

Reference numeral 62 denotes a damping force generation mechanism employed by the third embodiment. The damping force generation mechanism 62 is configured in a substantially similar manner to the damping force generation mechanism 11 employed by the first embodiment, and includes a pilot orifice 13, a pump 14, a relief valve 16 including pilot chambers 16A and 16B, an excessive load application prevention valve 21 for the pump 14, a communication pipe line 63, and a compression-side bypass pipe line 64.

However, according to the third embodiment, the one end side 63A of the communication pipe line 63 is directly connected to the hydraulic passage 45 of the piston rod 7 in constant communication therewith. Further, the other end 63B of the communication pipe line 63 is connected to an accumulator 72, which will be described later. The pilot orifice 13 and the pump 14 are disposed at certain positions along the communication pipe line 63. The excessive load application prevention valve 21 is connected to the communication pipe line 63 at the upstream side and the downstream side of the pump 14 so as to be arranged in parallel with the pump 14.

The compression-side bypass pipe line 64 is connected to the communication pipe line 63 at branch points 64A and 64B to allow the pilot orifice 13 and the pump 14 to be bypassed. The relief valve 16 is disposed at a certain position along the bypass pipe line 64. The relief valve 16 constitutes the compression-side damping valve 65 together with the pilot orifice 13. The pressure at the upstream side of the pilot orifice 13 (i.e., the pressure at the one end side 63A) is supplied into the pilot chamber 16A of the relief valve 16 via a pilot pipe line 18 as a pilot pressure. Like the first embodiment illustrated in FIG. 1, the pressure at the downstream side of the pilot orifice 13 (i.e., the pressure at the pump 14 side) is supplied into the pilot chamber 16B of the relief valve 16 via a pilot pipe line 19 as a pilot pressure.

Reference numeral 66 denotes an extension-side bypass pipe line employed by the third embodiment. The extension-side bypass pipe line 66 is, for example, connected to the communication pipe line 63 at branch points 66A and 66B to allow the pilot orifice 13 and the pump 14 to be bypassed. As a result, the extension-side bypass pipe line 66 and the compression-side bypass pipe line 64 are connected to the communication pipe line 63 so as to be arranged in parallel with each other.

An extension-side relief valve 67 is disposed at a certain position along the extension-side bypass pipe line 66. The extension-side relief valve 67 includes pilot chambers 67A and 67B and a pressure setting spring 67C, like the above-described relief valve 16. The extension-side relief valve 67 is opened when the pressure in the bottom-side hydraulic chamber B falls below the pressure in the accumulator 72, which will be described later, during an extension stroke of the piston rod 7. Except for that, the extension-side relief valve 67 is maintained in a closed state. The relief valve 16 is opened when the pressure in the bottom-side hydraulic chamber B exceeds the pressure in the accumulator 72, which will be described later, during a compression stroke of the piston rod 7. Except for that, the relief valve 16 is maintained in a closed state.

Reference numeral 68 denotes an extension-side pilot orifice disposed at a certain position along the communication pipe line 63. The extension-side pilot orifice 68 is disposed at a certain position along the communication pipe line 63 between the pump 14 and the accumulator 72. Then, the extension-side pilot orifice 68 constitutes an extension-side damping valve 69 together with the extension-side relief valve 67.

The pressure in the accumulator 72 is supplied into the pilot chamber 67A of the extension-side relief valve 67 via a pilot pipe line 70 as a pilot pressure. The extension-side relief valve 67 is driven by the pilot pressure in the valve opening direction against, for example, the pressure setting spring 67C. The pressure between the pump 14 and the pilot orifice 68 is supplied into the pilot chamber 67B of the relief valve 67 via a pilot pipe line 71 as a pilot pressure. The relief valve 67 is driven by this pilot pressure in the valve closing direction together with the pressure setting spring 67C.

The extension-side relief valve 67 is constantly biased in the valve closing direction by the pressure setting spring 67C, and is maintained in a closed state while the pilot pressure supplied into the pilot chamber 67A is lower than the total pressure value of the pilot pressure in the pilot chamber 67B and the biasing force applied by the pressure setting spring 67C. However, the extension-side relief valve 67 is opened when the pilot pressure supplied to the pilot chamber 67A exceeds the total pressure value of the pilot pressure in the pilot chamber 67B and the biasing force applied by the pressure setting spring 67C, allowing a flow of the hydraulic fluid from the branch point 66B to the branch point 66A of the bypass pipe line 66.

Reference numeral 72 denotes the accumulator serving as a reservoir employed in the third embodiment. The accumulator 72 is configured a similar manner to the accumulators 46 and 50 employed in the above-described second embodiment, and the interior thereof is divided into a gas chamber G and a hydraulic chamber H. However, the hydraulic chamber H in the accumulator 72 supplies or receives the hydraulic fluid to or from the hydraulic passage 45 of the piston rod 7 via, for example, the communication pipe line 63, or the bypass pipe line 64 or 66.

More specifically, the accumulator 72 supplies or discharges the hydraulic fluid for compensating for the volume of the piston rod 7 existing or entering the tube 42 to or from the hydraulic chamber H of the accumulator 72 when the piston rod 7 has an extension stroke or compression stroke relative to the tube 42. Then, the gas chamber G is compressed according to the hydraulic fluid amount supplied into the hydraulic chamber H, whereby the accumulator 72 as a pressure accumulator accumulates a pressure.

When the pump 14 is rotated in a normal direction indicated by an arrow E, the hydraulic fluid is discharged into the hydraulic chamber H of the accumulator 72 via the communication pipe line 63, thereby reducing the pilot pressure in the pilot chamber 16B. After the relief valve 16 is opened, the hydraulic fluid is also discharged into the hydraulic chamber H of the accumulator 72 via the extension-side bypass pipe line 64. Further, the pilot pressure is increased in the pilot chamber 67B by the pump 14 rotating in the arrow E direction via the pilot pipe line 71, as a result of which the extension-side relief valve 67 is maintained in a closed state.

On the contrary, when the pump 14 is rotated in the arrow F direction, the hydraulic fluid is supplied from the hydraulic chamber H of the accumulator 72 toward the pilot orifices 68 and 13, thereby increasing the pilot pressure in the pilot chamber 16B via the pilot pipe line 19. Therefore, the compression-side relief valve 16 is maintained in a closed state. However, the pilot pressure in the pilot chamber 67B is reduced by the pump 14 rotating in the arrow F direction via the pilot pipe line 71, thereby reducing the relief setting pressure of the extension-side relief valve 67 to reduce the resistance against opening of the relief valve 67. Then, after the relief valve 67 is opened, the hydraulic fluid is also supplied from the accumulator 72 to the hydraulic passage 45 of the piston rod 7 via the extension-side bypass pipe line 66 and the one end 63A of the communication pipe line 63.

In this way, according to the thus-configured third embodiment, during a compression stroke of the piston rod 7, a damping force is generated by the compression-side damping valve 65 constituted by the pilot orifice 13 and the relief valve 16. During an extension stroke of the piston rod 7, a damping force is generated by the extension-side damping valve 69 constituted by the pilot orifice 68 and the relief valve 67.

More specifically, during a compression stroke of the piston rod 7, the hydraulic fluid discharged from the bottom-side hydraulic chamber B in the tube 42 to the hydraulic passage 45 of the piston rod 7 is supplied to the hydraulic chamber H of the accumulator 72 via the communication pipe line 63, the pilot orifice 13, the pump 14, the pilot orifice 68, the compression-side bypass pipe line 64, and the relief valve 16, whereby the gas chamber G in the accumulator 72 is compressed by an amount corresponding to the hydraulic fluid amount supplied into the hydraulic chamber H, thereby realizing accumulation.

Reducing a resistance against the hydraulic fluid passing through the pump 14 to reduce the pressure at the downstream side of the pilot orifice 13, i.e., the pilot pressure in the pilot pipe line 19 results in a reduction in the relief setting pressure of the relief valve 16, thereby reducing the resistance against opening of the relief valve 16. Therefore, the hydraulic fluid transmitted from the branch point 64A into the bypass pipe line 64 passes through the opened relief valve 16 with a relatively small pressure loss. The remaining hydraulic fluid is supplied into the accumulator 72 via the pilot orifice 13 and the pump 14. In this way, when the pilot pressure is low in the pilot pipe line 19, the compression-side damping force is controlled to have a soft characteristic.

On the other hand, increasing a resistance against the hydraulic fluid passing through the pump 14 to increase the pilot pressure in the pilot pipe line 19 results in an increase in the relief setting pressure of the relief valve 16 to increase the resistance against opening of the relief valve 16. As a result, the compression-side damping force is controlled to have a hard characteristic. Further, a damping force harder than the compression-side hard characteristic (the compression-side super hard region 33B in FIG. 3) can be generated, by driving the pump 14 to rotate by the motor 20 so as to increase the resistance against the hydraulic fluid passing through the communication pipe line 63 and the pump 14 to supply the hydraulic fluid from the accumulator 72 toward the pump 14, such that a compression-side displacement of the piston rod 7 can be actively suppressed due to a force in the direction of an extension displacement.

On the other hand, during an extension stroke of the piston rod 7, the hydraulic fluid is supplied from the hydraulic chamber H of the accumulator 72 toward the communication pipe line 63, and this hydraulic fluid is transmitted into the bottom-side hydraulic chamber B via the pilot orifice 68, the pump 14, the pilot orifice 13, and the hydraulic passage 45 of the piston rod 7. At the same time, the hydraulic fluid is also transmitted from the hydraulic passage 45 to the bottom-side hydraulic chamber B via the extension-side bypass pipe line 66 and the relief valve 67.

At this time, reducing a resistance against the hydraulic fluid passing through the pump 14 to reduce the pilot pressure in the pilot pipe line 71 results in a reduction in the relief setting pressure of the relief valve 67 to reduce the resistance against opening of the relief valve 67, whereby the hydraulic fluid supplied from the branch point 66B to the extension-side bypass pipe line 66 passes through the opened relief valve 67 with a relatively small pressure loss. The remaining hydraulic fluid is transmitted into the bottom-side hydraulic chamber B in the tube 42 via the pilot orifice 68, the pump 14, and the pilot orifice 13. In this way, a reduction in the pilot pressure in the pilot pipe line 71 enables control for achieving a soft extension-side damping force.

On the other hand, increasing the hydraulic fluid passing through the pump 14 to increase the pilot pressure in the pilot pipe line 71 results in an increase in the relief setting pressure of the relief valve 67 to increase the resistance against opening of the relief valve 67. As a result, the compression-side damping force is controlled to have a hard characteristic. Further, a damping force harder than the extension-side hard characteristic (the extension-side super hard region 33A in FIG. 3) can be generated, by driving the pump 14 to rotate by the motor 20 so as to increase the resistance against the hydraulic fluid passing through the communication pipe line 63 and the pump 14 to, for example, cause a flow of the hydraulic fluid from the hydraulic passage 45 into the communication pipe line 63 such that an extension-side displacement of the piston rod 7 can be actively suppressed due to a force in the direction of a compression-side displacement.

The third embodiment is configured in such a manner that the damping force generation mechanism 62 (including, for example, the communication pipe line 63, the pilot orifices 13 and 68, the pump 14, the relief valves 16 and 67, and the bypass pipe lines 64 and 66) is disposed at the protruding end side of the piston rod 7, which will be the sprung side of the vehicle, to improve the mountability of the hydraulic cylinder 61 onto the vehicle. Then, the third embodiment is configured in such a manner that the hydraulic fluid is supplied and discharged between the hydraulic passage 45 provided to the piston rod 7 and the accumulator 72 according to an extension/compression operation of the piston rod 7.

However, the present invention is not limited thereto. For example, another embodiment may be configured in such a manner that the damping force valves 43 and 44 are removed from the piston 4 to establish constant communication between the bottom-side hydraulic chamber B and the rod-side hydraulic chamber C, i.e., the upper side and lower side of the piston 4, and the communication pipe line 63 (for example, the one end 63A) of the above-described damping force generation mechanism 62 is connected to the bottom 42A of the tube 42, i.e., the bottom-side hydraulic chamber B. The thus-configured embodiment can provide a substantially similar advantageous effect to the third embodiment.

Next, a fourth embodiment of the present invention will be described with reference to FIG. 6. The fourth embodiment is characterized in that two damping force generation mechanisms are prepared for shock absorbers mounted on front left and right wheels of the vehicle and rear left and right wheels of the vehicle in such a manner that the two damping force generation mechanism are in combination with the shock absorbers. In the following description of the fourth embodiment, like elements will be identified by the same reference numerals as the above-described second embodiment, and the descriptions thereof will be omitted.

Figure 6:
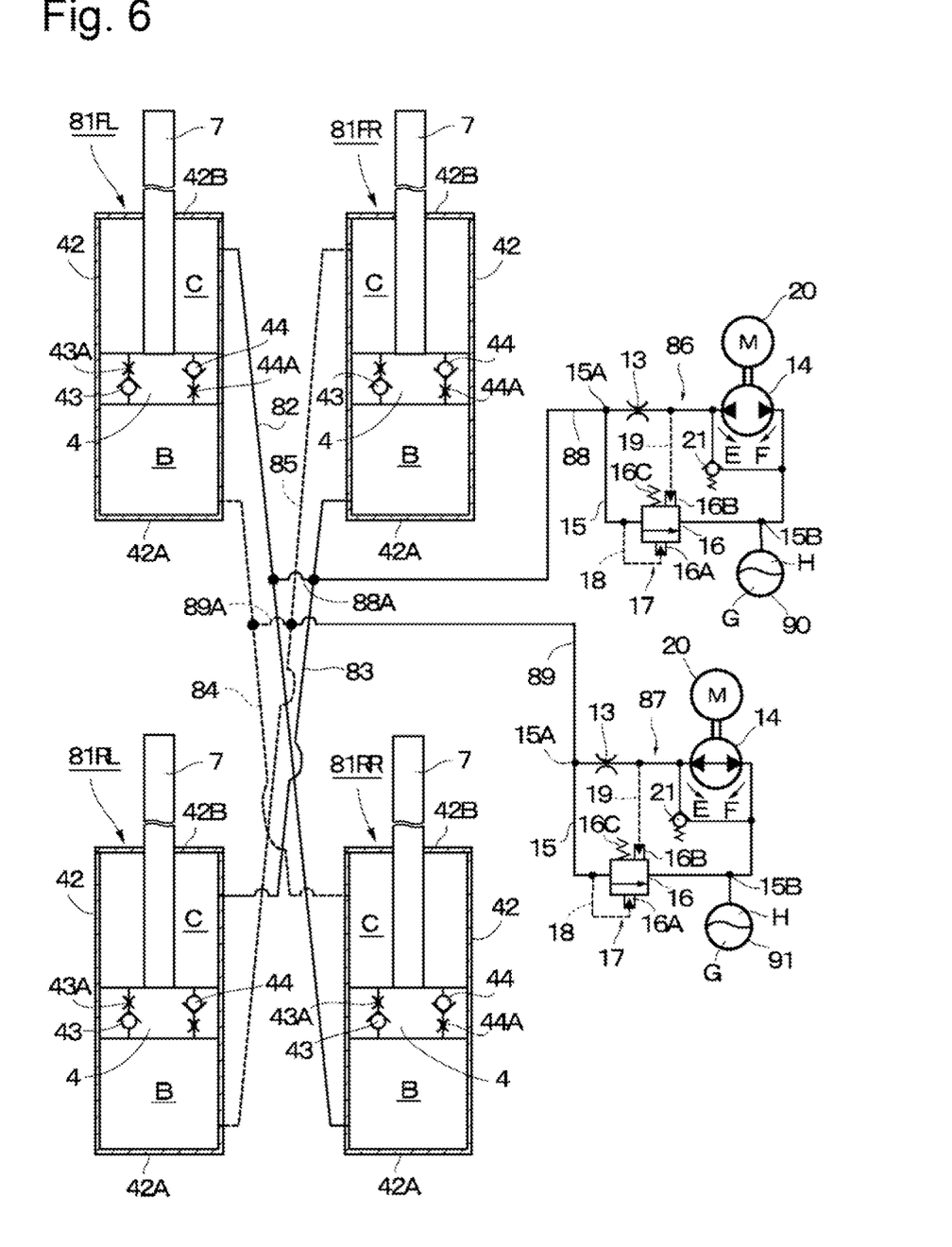
FIG. 6 illustrates an overall configuration of a hydraulic shock absorber and a suspension apparatus according to a fourth embodiment of the present invention.

In FIG. 6, reference numerals 81FL, 81FR, 81RL, and 81RR denote hydraulic cylinders employed by the fourth embodiment. Among these hydraulic cylinders, the hydraulic cylinder 81FL is mounted on the front left wheel of the vehicle, and the hydraulic cylinder 81FR is mounted on the front right wheel of the vehicle. The hydraulic cylinder 81RL is mounted on the rear left wheel of the vehicle and the hydraulic cylinder 81RR is mounted on the rear right wheel. These hydraulic cylinders 81FL, FR, RL, and RR are configured in a similar manner to the hydraulic cylinder 41 employed by the above-described second embodiment, and each includes a piston 4, a piston rod 7, a single-type tube 42, and extension-side and compression-side damping force valves 43 and 44.

However, in the present embodiment, the bottom-side hydraulic chambers B and the rod-side hydraulic chambers C of the respective hydraulic cylinders 81FL, 81FR, 81RL, and 81RR are connected with use of external pipes 82 to 85 as follows. The rod-side hydraulic chamber C of the hydraulic cylinder 81FL is connected to the bottom-side hydraulic chamber B of the hydraulic cylinder 81RR with use of the external pipe 82 indicated by the solid line. The bottom-side hydraulic chamber B of the hydraulic cylinder 81FR is connected to the rod-side hydraulic chamber C of the hydraulic cylinder 81RL with use of the external pipe 83 indicated by the solid lines. The external pipes 82 and 83 indicated by the solid lines are connected to a communication pipe 88, which will be described later, via a connection portion 88A while being in communication with each other at a certain position along the external pipes 82 and 83.

The bottom-side hydraulic chamber B of the hydraulic cylinder 81FL is connected to the rod-side hydraulic chamber C of the hydraulic cylinder 81RR with use of an external pipe 84 indicated by the dotted line. The rod-side hydraulic chamber C of the hydraulic cylinder 81FR is connected to the bottom-side hydraulic chamber B of the hydraulic cylinder 81RL with use of an external pipe 85 indicated by the dotted line. The external pipes 84 and 85 indicated by the dotted lines are connected to a communication pipe line 89, which will be described later, via a connection portion 89A while being in communication with each other at a certain position along the external pipes 84 and 85.

Reference numerals 86 and 87 denote first and second damping force generation mechanisms employed by the fourth embodiment. The first and second damping force generation mechanisms 86 and 87 are configured in a substantially similar manner to the damping force generation mechanism 11 employed by the first embodiment, and each include a pilot orifice 13, a pump 14, a bypass pipe line 15, a relief valve 16 including pilot chambers 16A and 16B, an excessive load application prevention valve 21 for the pump 14, and a communication pipe line 88 or 89.

However, according to the first damping force generation mechanism 86, one side of the communication pipe line 88 is connected to the external pipes 82 and 83 at the connection portion 88A. Further, the other side of the communication pipe line 88 is connected to an accumulator 90, which will be described later. The pilot orifice 13 and the pump 14 are disposed at certain positions along the communication pipe line 88. On the other hand, according to the second damping force generation mechanism 87, one side of the communication pipe line 89 is connected to the external pipes 84 and 85 at the connection portion 89A. Further, the other side of the communication pipe line 89 is connected to an accumulator 91, which will be described later. The pilot orifice 13 and the pump 14 are disposed at certain positions along the communication pipe line 89.

Reference numerals 90 and 91 each denote an accumulator serving as a reservoir employed by the fourth embodiment. The accumulators 90 and 91 are configured in a similar manner to the second accumulator 50 employed by the above-described second embodiment. The interiors of the accumulators 90 and 91 each are divided into a gas chamber G and a gas chamber H. However, in the present embodiment, the accumulator 90 functions as a reservoir at the first damping force generation mechanism 86, and the hydraulic chamber H thereof is connected to the other side of the communication pipe line 88 and is also connected to the bypass pipe line 15 via the branch point 15B. The accumulator 91 functions as a reservoir at the second damping force generation mechanism 87, and the hydraulic chamber H thereof is connected to the other side of the communication pipe line 89, and is also connected to the bypass pipe line 15 via the branch point 15B.

The thus-configured fourth embodiment is configured in such a manner that the first and second damping force generation mechanisms 86 and 87 are mounted as active mechanisms of suspension apparatuses at four wheels instead of, for example, a roll damping valve of a suspension apparatus (i.e., kinetic suspension) discussed in, for example, Japanese Patent Public Disclosure No. 2008-45738.

In this case, when the vehicle has respectively independent extension or compression strokes of the piston rods 7 at the hydraulic cylinder 81FL on the front left wheel, the hydraulic cylinder 81FR on the front right wheel, the hydraulic cylinder 81RL on the rear left wheel, and the hydraulic cylinder 81RR on the rear right wheel, a relatively small amount of hydraulic fluid is transmitted through the communication pipe lines 88 and 89 of the first and second damping force generation mechanisms 86 and 87. On the other hand, when the vehicle has a rolling motion generating opposite phases at the left and right sides or has a pitching motion generating opposite phases at the front and rear sides, a relatively large volume of the hydraulic fluid is transmitted through the communication pipe lines 88 and 89 of the damping force generation mechanisms 86 and 87.

The thus-configured fourth embodiment can independently control damping forces generated at the first and second damping force generation mechanisms 86 and 87 by controlling torques at the respective pumps 14 by using motors 2, respectively, in a similar manner to the first embodiment. Then, the fourth embodiment can provide a damping force softer or harder than the soft or hard characteristic (for example, the characteristics in the extension-side and compression-side super soft regions 32A and 32B, and the extension-side and compression-side super hard regions 33A and 33B illustrated in FIG. 3) by further supplying or discharging the hydraulic fluid to control damping forces individually generated by the first and second damping force generation mechanisms 86 and 87 from the soft side to the hard side.

Further, according to the fourth embodiment, required damping force mechanisms for one vehicle is only the first and second damping force generation mechanisms 86 and 87 (in other words, only two pairs of the pumps 14 and the motors 20 in total), thereby realizing a reduction in the cost and weight. For example, according to the first to third embodiments, one hydraulic cylinder 1 (41, 61) requires one damping force generation mechanism 11 (48, 62), i.e., one pair of the pump 14 and the motor 20. Compared to these embodiments, the fourth embodiment can reduce the cost and the weight of the shock absorber.

Next, a fifth embodiment of the present invention will be described with reference to FIG. 7. The fifth embodiment is characterized in that one damping force generation mechanism is prepared for the left-side and right-side hydraulic shock absorbers mounted on the left-side and right-side wheels of the vehicle. In the following description of the fifth embodiment, like elements will be identified by the same reference numerals as the above-described first embodiment, and the descriptions thereof will be omitted.

Figure 7:
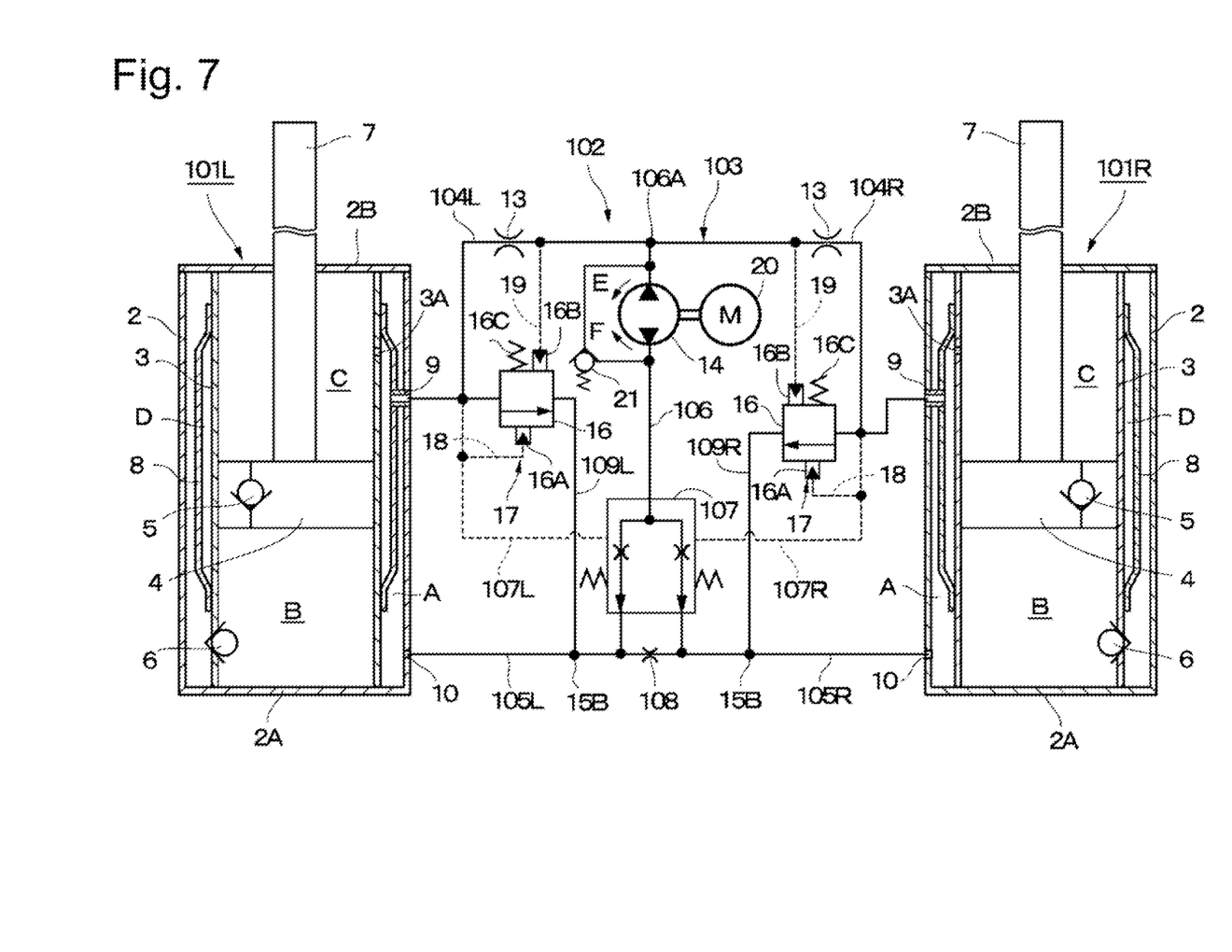
FIG. 7 illustrates an overall configuration of a hydraulic shock absorber and a suspension apparatus according to a fifth embodiment of the present invention.

In FIG. 7, reference numerals 101L and 101R denote left and right hydraulic cylinders mounted on the vehicle. The hydraulic cylinders 101L and 101R are configured in a similar manner to the hydraulic cylinder 1 employed by the first embodiment. The hydraulic cylinders 101L and 101R each include, for example, an outer tube 2 including a bottom portion 2A and a cover portion 2B, an inner tube 3, a piston 4, unidirectional valve 5 and 6, a piston rod 7, an intermediate tube 8, a joint 9, a port 10, a reservoir chamber A, a bottom-side hydraulic chamber B, a rod-side hydraulic chamber C, and an annular hydraulic chamber D.

Reference numeral 102 denotes a damping force generation mechanism employed by the fifth embodiment. The damping force generation mechanism 102 is configured in a substantially similar manner to the damping force generation mechanism 1 employed by the first embodiment, and includes pilot orifices 13, a pump 14, relief valves 16 including pilot chambers 16A and 16B, excessive load application prevention valves 21 for the pump 14, a communication pipe line 103, and bypass pipe lines 109L and 109R.

However, in the damping force generation mechanism 102 in the present embodiment, a single pump 14 is shared by the left and right hydraulic cylinders 101L and 101R, so that the communication pipe line 103 includes one side pipe line portions 104L and 104R branched to the left and right, the other side pipe line portions 105L and 105R branched to the left and right, and a common pipe line portion 106 establishing communication between the one side pipe line portions 104L and 104R and the other side pipe line portions 105L and 105R via a flow dividing valve 107, which will be described later.

The one side pipe line portion 104L of the communication pipe line 103 is connected to the left-side hydraulic cylinder 101L via the joint 9. The right one side pipe line portion 104R is connected to the joint 9 of the right-side hydraulic cylinder 101R. Then, both the one side pipe line portions 104L and 104R are connected to the common pipe line portion 106 at the connection point 106A. A pump 14 is disposed at a certain point along the common pipe line portion 106.

An excessive load application prevention valve 21 is connected to the common pipe line portion 106 at the upstream and downstream sides of the pump 14 so as to be arranged in parallel with the pump 14. The pilot orifices 13 are disposed at certain positions along the one side pipe line portions 104L and 104R, respectively. Pilot pipe lines 19 are connected between the connection position 106A of the common pipe line portion 106 and the pilot orifices 13, respectively.

The other side pipe line portion 105L of the connection pipe line 103 is connected to the reservoir chamber A of the left-side hydraulic cylinder 101L via the port 10, and the other side pipe line portion 105R at the right side is connected to the reservoir chamber A of the right-side hydraulic cylinder 101R via the port 10. Then, both of the other side pipe line portions 105L and 105R are connected to the common pipe line portion 106 via the flow dividing valve 107, which will be described later.

Reference numeral 107 denotes the flow dividing valve disposed between the other side pipe line portions 105L and 105R and the common pipe line portion 106. The flow dividing valve 107 divides a flow of the hydraulic fluid between the left and right hydraulic cylinders 101L and 101R. More specifically, the flow dividing valve 107, for example, allows the hydraulic fluid discharged from the rod-side hydraulic chamber C of the left-side hydraulic cylinder 101L to be supplied into the reservoir chamber A of the hydraulic cylinder 101L by a same amount, and further allows the hydraulic fluid discharged from the rod-side hydraulic chamber C of the right-side hydraulic cylinder 101R to be supplied into the reservoir chamber A of the hydraulic cylinder 101R by a same amount. Therefore, the flow dividing valve 107 is provided with left and right pilot pipe lines 107L and 107R, to which pressures are supplied from the left and light hydraulic cylinders 101L and 101R via the joints 9 as pilot pressures.

Reference numeral 108 denotes a restriction passage disposed between the other side pipe line portions 105L and 105R. The restriction passage 108 is connected between the other side pipe line portions 105L and 105R in parallel with the flow diving valve 107. The restriction passage 108 is formed to have, for example, an orifice diameter of approximately 0.1 mm, and functions to equalize the pressure and the hydraulic fluid amount in the reservoir chamber A between the left and right hydraulic cylinders 101L and 101R.

Reference numerals 109L and 109R denote bypass pipe lines employed by the fifth embodiment. The bypass pipe lines 109L and 109R are configured in a substantially similar manner to the bypass pipe line 15 employed by the first embodiment. The bypass lines 109L and 109R are connected to the one side pipe line portions 104L and 104R and the other side pipe line portions 105L and 105R of the communication pipe line 103 to allow the left and right pilot orifices 13 and the pump 14 to be bypassed. Left and right relief valves 16 are disposed at certain positions along the bypass pipe lines 109L and 109R. The left and right relief valves 16 constitute damping valves 17 together with the left and light pilot orifices 13, respectively.

The pressure at the upstream side of the pilot orifice 13 (i.e., the pressure at the joint 9 side) is supplied into the pilot chamber 16A of the relief valve 16 via the pilot pipe line 18 as a pilot pressure. The pressure at the downstream side of the pilot orifice 13 (i.e., the pressure at the pump 14 side) is supplied into the pilot chamber 16B of the relief valve 16 via the pilot pipe line 19 as a pilot pressure.

In this way, according to the thus-configured fifth embodiment, the hydraulic fluid discharged from the rod-side hydraulic chambers C due to extraction/compression motions of the piston rods 7 at the left and right hydraulic cylinders 101L and 101R is transmitted through the pilot orifices 13 at the one side pipe line portions 104L and 1048 and pump 14 of the common pipe line portion 106, and is also transmitted through the relief valves 16 at the bypass pipe lines 109L and 109R. In the end, the hydraulic fluid is returned to the reservoir chambers A of the hydraulic cylinders 101L and 101R, in a substantially similar manner to the damping force generation mechanism 11 employed by the first embodiment. At this time, the hydraulic fluid passes through the flow dividing valve 107, thereby can be returned to the reservoir chambers A by amounts corresponding to amounts discharged from the left and right hydraulic cylinders 101L and 101R.

Further, the thus-configured fifth embodiment is configured in such a manner that a pair of the left and right hydraulic cylinders 101L and 101R is disposed at the front wheel side of the vehicle, and this pair is also disposed at the rear wheel side. Therefore, the fifth embodiment requires only two damping force generation mechanisms 102 for one vehicle (i.e., only two pairs of the pumps 14 and the motors 20 in total), thereby realizing a reduction in the cost and the weight. Further, when a roll moment is generated due to, for example, a cornering operation of the vehicle, the fifth embodiment can stop the roll motion, for example, by increasing the pilot pressure at the pilot pipe line 19 to control the damping force to have a hard characteristic. In this way, the fifth embodiment can provide steering stability equivalent to the one in an embodiment having motors on each of the four wheels, although the fifth embodiment include only two motors 20.

According to any of the above-described first to fifth embodiments of the present invention, it is possible to adjust the range within which the damping force can vary, and adjust the regeneration function as follows. If this is described based on the first embodiment among the above-described first to fifth embodiments by way of example, it is possible to adjust the range within which the damping force can vary, and adjust the regeneration function, by changing the pressure setting spring 16C of the relief valve 16 (a disk in a case where the relief valve 16 is embodied by a disk valve), the orifice diameter of the pilot orifice 13, the capacity of the pump 14 and the motor 20.

In this case, increasing the size of the cutout of the disk makes it impossible to generate a damping force in the semi-active region when the piston moves a low speed. Therefore, the operation range of the pump (=active region) is increased to obtain the steering stability, and the soft damping force in the semi-active region is reduced, improving the ride comfort. This also applies to the opposite case. Further, reducing the orifice diameter of the pilot orifice 13 results in a reduction in the pilot flow amount, thereby enabling control of the pilot pressure even with the pump 14 and the motor 20 having low capacity. On the other hand, for an active operation, power is wastefully consumed due to the pressure loss at the pilot orifice 13, and the responsiveness is deteriorated due to the inability to flow a large flow amount. Further, the regeneration function becomes less effective due to the reduction in the pilot flow amount. This also applies to the opposite case.

Further, when the motor or the pump malfunctions (function failure), short-circuiting the wiring of the motor 20 to generate a resistance can prevent the pilot pressure from being reduced, thereby maintaining a required damping force. Alternatively, a normally closed electromagnetic valve is disposed on the flow route of the pump 14, and a required pilot pressure may be maintained by this electromagnetic valve at the time of a failure.

Next, a method for carrying out the present invention when the motor 20 is changed will be briefly described. For example, when a highly powerful and efficient motor can be used as the motor 20, it is possible to increase the variable range of the semi-active region and increase an energy amount generated by regeneration by increasing the orifice diameter of the pilot orifice 13 to allow a large amount of the hydraulic fluid to be transmitted through the pump 14. Further, since the active region can be also increased by utilizing an output of the motor, a highly effective shock absorber can be realized. However, actually, a high-capacity motor cannot be employed due to the reasons of weight, cost, and mountability, so a small and low-capacity motor should be employed.

When a small and less powerful motor is used as the motor 20, the orifice diameter of the pilot orifice 13 is reduced so as to reduce a flow amount transmitted to the pump. Therefore, the regeneration function is sacrificed, but it is possible to provide a sufficient effect by controlling the pilot pressure and largely changing a damping force with a small power source. Further, as mentioned above, for example, it is possible to perform active control corresponding to a flow amount compensating for a leaking flow amount only in the extension direction. Further, when, for example, a small and brushed motor is used as the motor 20, the regeneration function cannot be realized and active control cannot be performed by controlling the rotational direction. However, it is possible to use it in the semi-active region by performing, for example, electric current feedback control to control the torque to control the pilot pressure.

Further, the above-described embodiments have been described based on an example using the pressure sensor 26 as the upstream pressure detector capable of detecting the pressure at the upstream side of the damping valve. However, the present invention is not limited thereto. For example, the upstream pressure detector may be embodied by an estimation unit configured to estimate the upstream pressure from another motion element. A possible estimation unit in this case may be, for example, a unit configured to detect power input to the pump, store a map in the memory provided to the controller, and acquire the cylinder pressure corresponding to the torque corresponding to the input, thereby estimating the upstream pressure. Alternatively, strain sensor may be attached to the piston rod, a thrust force applied to the piston rod may be calculated from a detection signal (strain amount) from the strain sensor, and the pump may be controlled by the motor so as to achieve a damping force for generating the required thrust force.

Further, the above-described embodiments have been described based on an example in which the hydraulic shock absorber and the suspension apparatus are used as a shock absorber mounted on a vehicle such as an automobile. However, the present invention is not limited thereto, and the present invention may be applied to a shock absorber used in, for example, various kinds of machines and buildings that may become a vibration source.

As mentioned above, according to the embodiments of the present invention, the pump is configured as a bidirectional pump, by which the operating fluid is supplied to or discharged from the pilot chamber. Therefore, it is possible to variably control the pilot pressure (the relief setting pressure of the relief valve) applied to the pilot chamber, thereby allowing the shock absorber to function as an active suspension.

According to the above-described embodiments, the operating fluid is liquid. The cylinder of the shock absorber includes the reservoir sealingly containing the liquid and gas for compensating for the volume in the cylinder. The pump is configured to supply and discharge the liquid between the cylinder and the reservoir. As a result, it is possible to supply or discharge the fluid between the cylinder and the reservoir when the piton rod has an extension or compression stroke relative to the cylinder, thereby realizing both the semi-active suspension function and the active suspension function with a small structure and a low-consumption power source. The damping force generation mechanism is provided with the excessive load application prevention valve for preventing an excessive load from being applied to the pump, thereby preventing an excessive pressure from being applied to the pump to improve the durability, prolong the operating life, and enhance the reliability of the pump.

According to the above-described embodiments, the suspension apparatus includes the upstream pressure detection capable of detecting the pressure at the upstream side of the damping valve, and is configured in such a manner that the controller controls the pump based on the detection result of the upstream pressure detector. The pressure in the cylinder can be detected by the upstream pressure detector, and the controller can calculate a control current value to be output to the motor as a pump torque so that the deviation between the detected pressure and the target pressure falls within a predetermined range around a predetermined value.

According to the above-described embodiments, the damping force generation mechanism utilizes the flow passage within the piston rod (for example, the hydraulic passage 45 illustrated in FIGS. 4 and 5), thereby allowing the damping force mechanism to be mounted on the sprung side to improve the mountability. Combination with a kinetic suspension or communication between the left side and right side can reduce the number of required motors by half for one vehicle, thereby realizing a further cost reduction.

In a case where the above-described embodiments are used to increase the damping force when the piston moves at a low speed, the passage where the pilot orifice 13 is disposed may be omitted and the pump 14 may be used only for pressure control of the pilot chamber.

Further, the pump 14 may be a unidirectional pump. In this case, the shock absorber has to include a passage for discharging the pressure in the pilot chamber 16B to the downstream side, and an electromagnetic control valve or a fixed orifice at this discharge passage.

Further, the above-described embodiments have been described based on an example in which the pump mechanism, the damping valve, and others are disposed outside the cylinder. However, these mechanisms may be disposed at the piston portion and the tip of the piston rod.

According to the above-described embodiments, it is possible to realize the shock absorber and the suspension apparatus capable of generating a wide range of damping forces while keeping energy conservation.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority to Japanese Patent Applications No. 2011-121949 filed on May 31, 2011. The entire disclosure of Japanese Patent Application No. 2011-121949 filed on May 31, 2011 including specification, claims, drawings and summary is incorporated herein by reference in its entirety.

The entire disclosure of Japanese Patent Public Disclosure Nos. 2008-45738 and 2009-281584 including specification, claims, drawings and summary is incorporated herein by reference in its entirety.

What is claimed is:

1. A shock absorber comprising:
   at least one cylinder apparatus comprising a cylinder sealingly containing operating fluid, a piston slidably fittedly inserted in the cylinder to divide an interior of the cylinder into two chambers, and a piston rod coupled to the piston and extending to an outside of the cylinder; and
   at least one damping force generation mechanism connected to the cylinder apparatus, the damping force generation mechanism being capable of generating a damping force to be applied to a flow of the operating fluid caused by a movement of the piston and adjusting the damping force by control signals supplied from outside of the shock absorber,
   the damping force generation mechanism comprising a damping valve for generating the damping force, a pilot chamber for applying a pilot pressure by the operating fluid to the damping valve, and a pump for at least supplying or discharging the operating fluid to or from the pilot chamber,
   wherein the operating fluid is liquid,
   the cylinder includes a reservoir sealingly containing the liquid and gas for compensating for a volume of the cylinder, and
   the pump supplies and discharges the liquid between the reservoir and the cylinder.

2. The shock absorber according to claim 1, wherein the pump can supply and discharge the operating fluid to and from the pilot chamber as a bidirectional pump.

3. The shock absorber according to claim 2, wherein the pilot chamber is in constant communication with an upstream side of the damping valve via an orifice.

4. A suspension apparatus comprising:
   the shock absorber according to claim 2, the shock absorber configured to be disposed between a vehicle body and a wheel of a vehicle;
   a controller for controlling the damping force generation mechanism of the shock absorber; and
   an upstream pressure detector capable of detecting a pressure at an upstream side of the damping valve,
   wherein the controller controls the pump based on a detection result of the upstream pressure detector.

5. The shock absorber according to claim 1, wherein the pilot chamber is in constant communication with an upstream side of the damping valve via an orifice.

6. A suspension apparatus comprising:
   the shock absorber according to claim 5, the shock absorber configured to be disposed between a vehicle body and a wheel of a vehicle;
   a controller for controlling the damping force generation mechanism of the shock absorber; and an upstream pressure detector capable of detecting a pressure at an upstream side of the damping valve, wherein the controller controls the pump based on a detection result of the upstream pressure detector.

7. The shock absorber according to claim 1, wherein the damping force generation mechanism further includes an excessive load application prevention valve for preventing an excessive load from being applied to the pump.

8. A suspension apparatus comprising:
the shock absorber according to claim 7, the shock absorber configured to be disposed between a vehicle body and a wheel of a vehicle;
a controller for controlling the damping force generation mechanism of the shock absorber; and
an upstream pressure detector capable of detecting a pressure at an upstream side of the damping valve,
wherein the controller controls the pump based on a detection result of the upstream pressure detector.

9. The shock absorber according to claim 1, wherein one of the chambers in the cylinder and the damping force generation mechanism are connected with each other via an axially extending hydraulic passage formed at the piston and the piston rod.

10. The shock absorber according to claim 1, wherein the damping force generation mechanism includes a damping valve for an extension stroke of the piston, and a damping valve for a compression stroke of the piston.

11. The shock absorber according to claim 1, wherein the at least one cylinder apparatus comprises first to fourth cylinder apparatuses,
wherein the two chambers are an upper chamber and a lower chamber, and
wherein the at least one damping force generation mechanism comprises
a first damping force generation mechanism connected to a first hydraulic passage and a second hydraulic passage, the first hydraulic passage connecting the upper chamber of the first cylinder and the lower chamber of the fourth cylinder, the second hydraulic passage connecting the lower chamber of the second cylinder and the upper chamber of the third cylinder, and
a second damping force generation mechanism connected to a third hydraulic passage and a fourth hydraulic passage, the third hydraulic passage connecting the lower chamber of the first cylinder and the upper chamber of the fourth cylinder, the fourth hydraulic passage connecting the upper chamber of the second cylinder and the lower chamber of the third cylinder.

12. The shock absorber according to claim 1, wherein the at least one cylinder apparatus comprises first and second cylinder apparatuses, and
wherein the damping force generation mechanism includes
a damping valve and a pilot chamber for the first cylinder apparatus,
a damping valve and a pilot chamber for the second cylinder apparatus, and
a common pump for controlling pressures in the both pilot chambers for the first and second cylinder apparatuses.

13. A suspension apparatus comprising:
the shock absorber according to claim 1, the shock absorber configured to be disposed between a vehicle body and a wheel of a vehicle;
a controller for controlling the damping force generation mechanism of the shock absorber; and
an upstream pressure detector capable of detecting a pressure at an upstream side of the damping valve,
wherein the controller controls the pump based on a detection result of the upstream pressure detector.

14. The suspension apparatus according to claim 13, wherein the upstream pressure detector comprises an estimator configured to estimate the pressure at the upstream side from another motion element.

* * * * *